(12) United States Patent
Hayhurst et al.

(10) Patent No.: US 6,847,334 B2
(45) Date of Patent: *Jan. 25, 2005

(54) MOBILE TELECOMMUNICATION DEVICE FOR SIMULTANEOUSLY TRANSMITTING AND RECEIVING SOUND AND IMAGE DATA

(75) Inventors: Bill Hayhurst, Aurora, OR (US); Frederick H. Ward, Poway, CA (US); James H. Dabney, Irvine, CA (US)

(73) Assignee: William Hayhurst, Aurora, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,426
(22) PCT Filed: Jun. 29, 1998
(86) PCT No.: PCT/US98/13566
§ 371 (c)(1), (2), (4) Date: Mar. 13, 2000
(87) PCT Pub. No.: WO99/01859
PCT Pub. Date: Jan. 14, 1999

(65) Prior Publication Data
US 2003/0107529 A1 Jun. 12, 2003

(51) Int. Cl.[7] .................................................. G09G 5/00
(52) U.S. Cl. ......................................... 345/1.2; 345/2.2
(58) Field of Search .......................... 345/1.1, 1.2, 2.1, 345/2.2, 2.3, 667, 668, 669, 670, 671, 173, 174, 175, 835, 838, 840, 733, 734, 739, 740, 753, 754; 709/204–25; 348/14.01–14.06

(56) References Cited
U.S. PATENT DOCUMENTS

| | | |
|---|---|---|
| 2,895,005 A | 7/1959 | Kock |
| 3,974,329 A | 8/1976 | Zenzefilis |
| 4,504,858 A | 3/1985 | Franke |
| 4,710,917 A | 12/1987 | Tompkins |
| 4,748,511 A | 5/1988 | Nichols |
| 4,876,597 A | 10/1989 | Roy |
| 4,930,144 A | 5/1990 | Plut et al. |
| 4,951,147 A | 8/1990 | Aknar |
| 4,965,819 A | 10/1990 | Kannes |
| 4,991,193 A | 2/1991 | Cecil |
| 5,061,992 A | 10/1991 | Ueno |
| 5,164,980 A | 11/1992 | Bush |
| 5,168,269 A | * 12/1992 | Harlan .......................... 345/5 |
| 5,388,196 A | * 2/1995 | Pajak et al. .................. 345/751 |
| 5,416,819 A | 5/1995 | Uzuyama |
| 5,495,284 A | 2/1996 | Katz |
| 5,508,713 A | 4/1996 | Okouchi |
| 5,526,037 A | 6/1996 | Cortjens |
| 5,544,300 A | 8/1996 | Skarbo |
| 5,553,609 A | 9/1996 | Chen |
| 5,634,018 A | 5/1997 | Tanikoshi |
| 5,727,155 A | * 3/1998 | Dawson ....................... 709/205 |

OTHER PUBLICATIONS

Cowart, Mastering Windows 3.1, Special Edition, pp. 904–911 and 927–928, 1993.*

* cited by examiner

Primary Examiner—Chanh Nguyen
(74) Attorney, Agent, or Firm—Ipsolon llp

(57) ABSTRACT

A mobile telecommunication unit (20) provides two-way remote viewing of images and real time audio. The self-contained, portable unit (20) communicates directly with a similar unit at a remote location across POTS lines, cellular, ISDN, T-1, and satellite communication links. The unit (20) includes mass storage for archiving images. Input devices (25) for each unit include a digital camera (36) through a PCMCIA card, electronic stethoscope, telephone handset, speakerphone, external microphone, and serial and parallel ports. The output devices include a full color screen (22) for viewing local and received images and a speaker for audio output. A hard copy of images can be made by a video printer or desktop printer (42). Images can be uploaded to a PC.

15 Claims, 10 Drawing Sheets

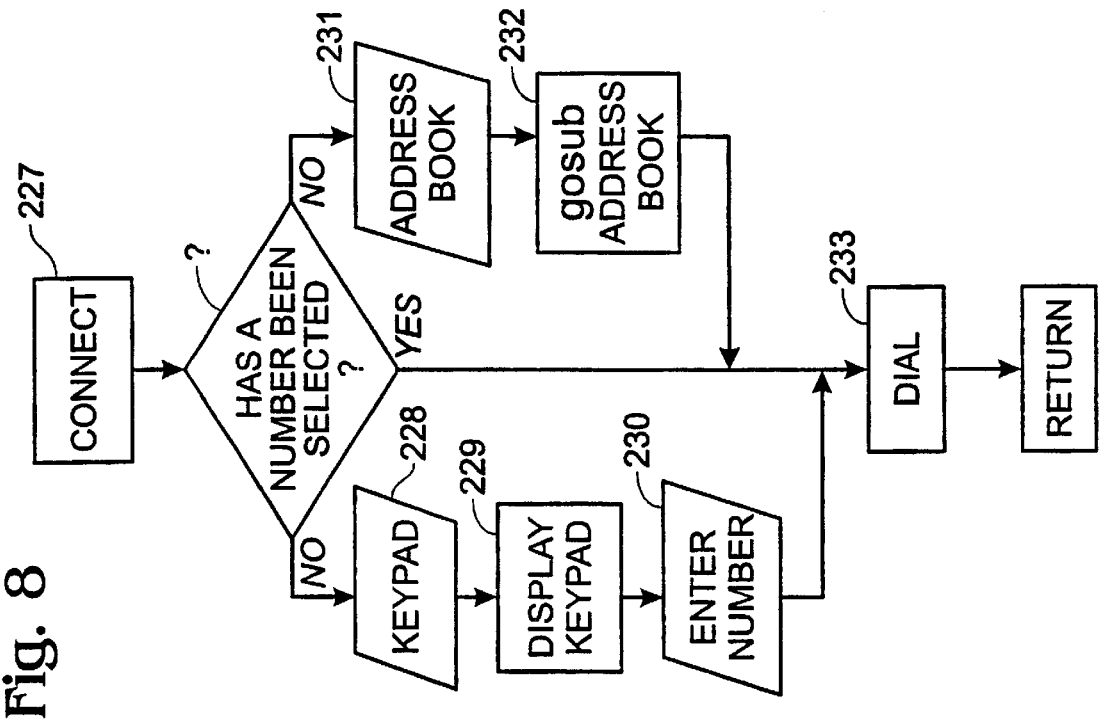
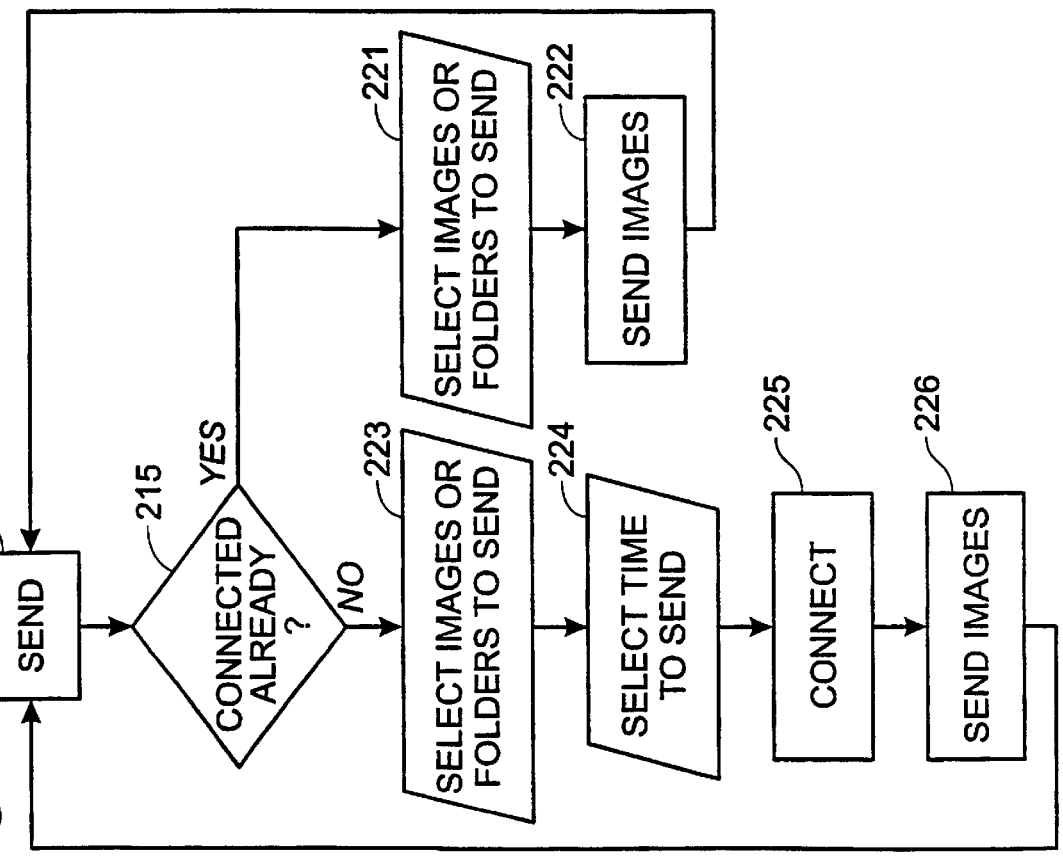

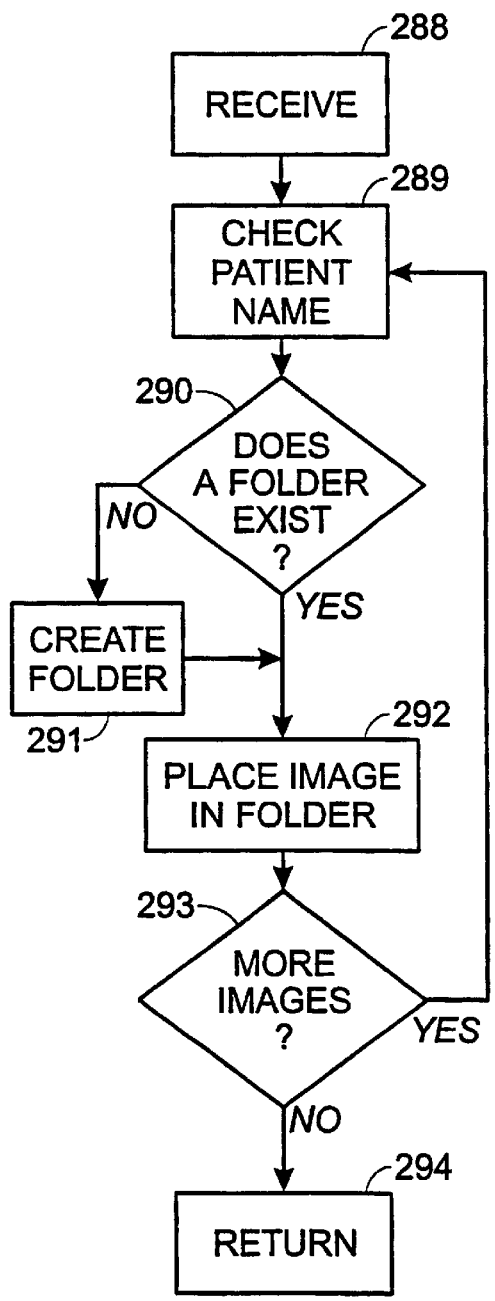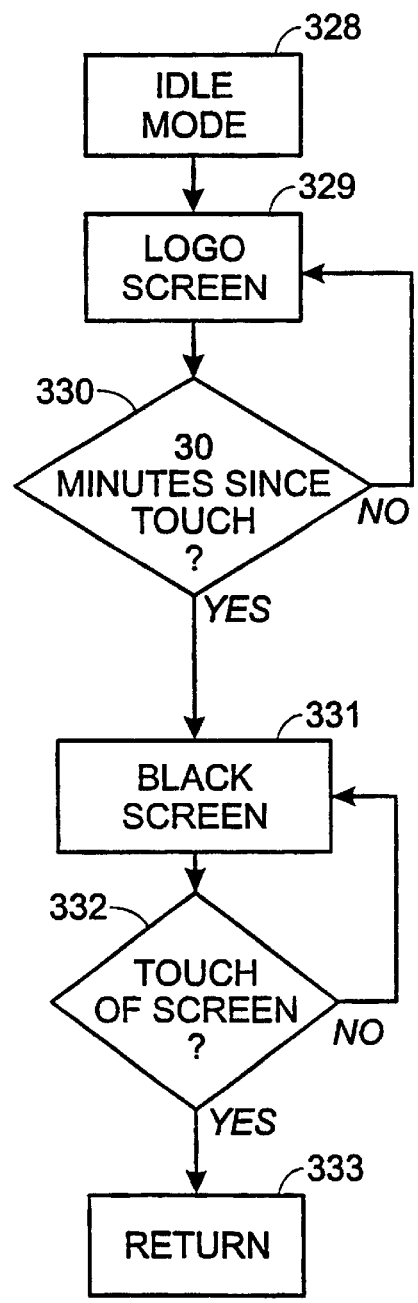

MOBILE TELECOMMUNICATION DEVICE FOR SIMULTANEOUSLY TRANSMITTING AND RECEIVING SOUND AND IMAGE DATA

TECHNICAL FIELD

The invention generally relates to a telecommunication device that allows remote consultation in a variety of fields such as medicine, real estate, insurance, engineering. More particularly, it allows an expert to take part in analysis of an event from a remote location by two-way transmission of sound and image data.

BACKGROUND

In many industries, the ability to converse and share images with an individual located remotely can provide a great advantage. Communicating by phone is inadequate in many cases, and particularly in the medical industry, where it is critical to have visual information to make a thorough diagnosis. A device that could send visual information on the spot would save time, and money in shipping costs. Such devices exist today, but they are very expensive and typically communicate only between two fixed points.

Many industries in today's economy could take advantage of a portable and versatile device that could communicate still images and audio to remote locations without the need for a central unit. Today, an individual must physically visit a site, or send a hard copy of an image. A real estate agent must ship pictures across the country, consuming time and shipping costs. An insurance claims agent must send pictures to a central office to process claims. An engineer must physically visit a site to inspect problems.

The medical industry in particular may benefit from such device. A rural doctor must consult by telephone and describe the injury, usually unsatisfactorily, or ship x-rays or other diagnostic data, or even send the patient to the specialist. An Emergency Medical Technician must describe injuries to emergency room personnel. A doctor on-call must drive into the emergency room, not knowing specifics of an injury. A physician must wait for x-ray, MRI, or CT images to be shipped to an insurance company for authorization. All of this takes up valuable treatment time.

In recent years, medical costs have sky-rocketed. Driven by HMO's and other economic factors, efforts to decrease health care costs are being aggressively pursued. A device that transmits images of patient injuries in a matter of seconds to anywhere in the world would save expensive shipping costs of such images. More importantly, it would expedite the treatment of injuries, and offer access to specialists in geographic areas where it is not possible today.

SUMMARY OF THE INVENTION

The invention provides an alternative solution that avoids the delay and high cost of shipping images and enables a user to provide a diagnosis from a remote location via simultaneous transmission of voice, image and possibly other data. Specifically, the invention provides a mobile telecommunication unit that sends audio and image information simultaneously and eliminates the cost and delay of shipping images and other diagnostic information. The device is portable, supports a variety of modes of telecommunication (e.g., POTS, cellular, ISDN, T-1, or satellite), and can send voice data and possibly other sounds simultaneously with image data.

One implementation of the invention is a portable, mobile telecommunication unit that is designed to transmit voice and still image data simultaneously to a compatible device on the other end of a telephone connection. One unit is placed into contact with a second, compatible device by a phone call. All controls, except for a power switch, are entered on virtual buttons on a touch screen. The telephone connection is made via POTS, or optional cellular, ISDN, T-1, or satellite. To capture an image, the user takes a picture with a digital camera provided with the unit. Through a camera interface, the digital camera transfers an image to the local unit. The local unit can then transmit the image to the remote unit.

In the course of capturing and viewing the image, the image data is modified somewhat to include fields for carrying text information, such as patient name, doctor, birth date, date of the image, and case notes (specific information concerning the patients medical condition).

The users at each location can talk to each other on the same telephone connection because the units transfer voice and image data to each other simultaneously. The user at the remote site can request, in real time, another view or a zoomed image. Consultation is much more accurate when both parties are viewing the same image and are able to converse. In this regard, discrete pointers or tags may be instantaneously added to the image by one or both parties (hence transmitted to and viewed by the other party) to direct the conversation to selected features of the image. The pointer information is generated and transmitted in a way such that the position of the pointer relative to the remainder of the image will be constant irrespective of other changes in the view of the image, such as panning or zooming.

To further focus the conversation about an image, pointers placed on an image at remote unit will have a different appearance (such as by coloring) than pointers generated on a local unit. Thus, both parties have an immediate graphical indication of which pointer was generated by which party.

The pointers may be instantaneously removed from the image or stored with the image for future reference. In this regard, the above mentioned case notes can refer to pointers added to and saved with the image. This correlation between the text and image information speeds the review and comprehension of the patient information.

The unit at either end of the telephone connection can archive all the pictures transferred or selected images on the internal hard drive. Software executing in a unit controller enables the user to categorize images on the hard drive into folders unique to the individual. When a telephone connection with a remote system is established, and images are to be sent, the receiving system is checked for an existing folder for the individual. If it is not found, one is created. As noted, information such as patient name, time, date, and referring physician is sent with the image.

Every image collected from, for example, a digital camera is provided with a unique filename that includes a multi-digit number and a code identifying the particular unit. Thus, there is no likelihood that two different images residing in one unit will have the same filename. Similarly, the use of the code that identifies the particular unit ensures that different images from two machines will not, by chance, end up with the same filename. It will be appreciated that the elimination of confusion as to image filenames is particularly important when the system is used, for example, for diagnostic and treatment procedures.

Either user can make a hard copy of the information with a printer accessory. One or both of the users can view the images on an external monitor, and listen on an external speaker. Either user can use a phone handset, or a hands-free speakerphone. An external microphone can be used, or an electronic stethoscope can be plugged into hear a patient's heartbeat or breathing. An optional software enhancement can send and display EKG data.

Another application is in the real estate industry. For example, a real estate agent can use the mobile telecommunication unit to give a tour of a home on the East Coast to a prospective buyer on the West Coast. The agent can give a walk-through, room-by-room, showing different angles requested by the buyer. The agent can then travel outside to show the exterior and the neighborhood. This will allow a more thorough tour than would a small packet of snapshots, and will be tailored exactly to the buyer's request.

Yet another application of the invention is in the insurance industry. An insurance claims agent can survey damage, and immediately send the information to the central office. This allows accurate, on-the-spot claim processing, saves shipping costs, and provides more effective customer service.

In yet another application, an engineer could check the progress of a project across town or across the country without having to waste time traveling to the location. Viewing the project would allow a more accurate analysis than a verbal description over the phone. It would save unnecessary trips, time, and money.

The invention can provide a significant improvement in providing medical services. A doctor in a rural location could consult with a specialist in another region, providing service to a community not presently available. The patient may not have to be transported hundreds of miles for treatment that could have been performed in their hometown, saving thousands of dollars in ambulance fees. An emergency medical technician could consult with the emergency room doctor, and start treatment on the way to the hospital, saving the most valuable time in trauma treatment. A doctor on call could diagnose the patient from home, possibly saving unnecessary trips to the emergency room. Alternatively, the doctor could instruct the operating room personnel on special needs for a special procedure, saving valuable treatment time. A physician could send an image to an insurance company for instant approval, instead of waiting the standard two weeks now allocated.

The invention could be used in other industries as well, such as geologic survey, business consulting, advertising, and visual consulting of all sorts.

Additional features and advantages of the invention will become more apparent from the following description of the preferred embodiment.

BRIEF DESCRIPTION OF THE DRAWINGS

FIG. 7 is a flow diagram illustrating the operation of the unit when the user activates the send module from the start up screen.

FIG. 8 is a flow diagram illustrating the operation of the connect module.

FIG. 12 is a flow diagram illustrating the operation of the system when the receive module is activated.

FIG. 16 is a flow diagram illustrating the operation of the system while it is in idle mode.

BEST MODES FOR CARRYING OUT THE INVENTION

Figure 1:
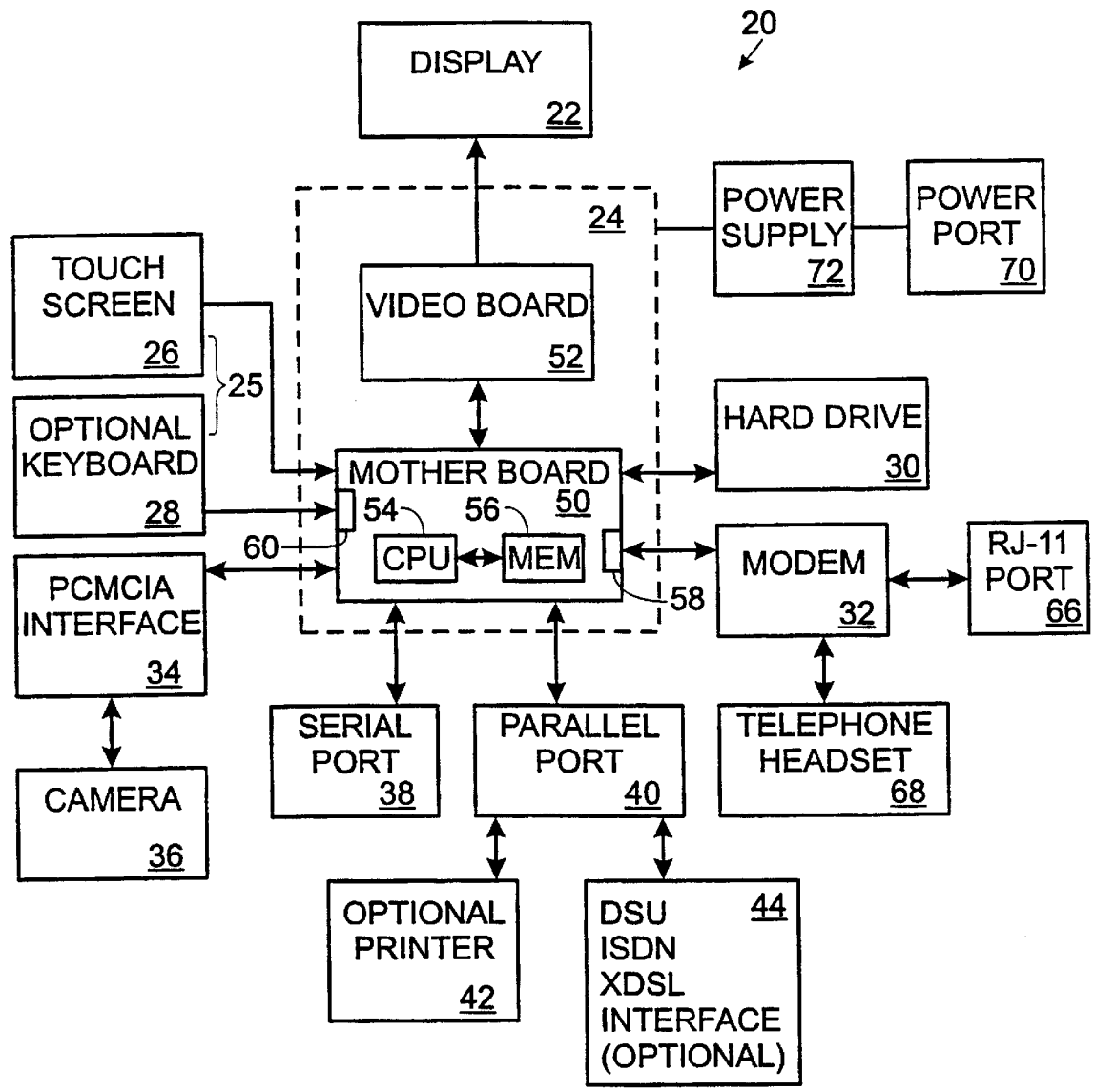
FIG. 1 is a block diagram illustrating an embodiment of a mobile telecommunication unit designed according to the invention.

FIG. 1 is a block diagram illustrating an implementation of a mobile telecommunication unit 20 designed according to the invention. The unit 20 includes a display 22, a unit controller 24, a user input device 25 (touch screen 26, and optional keyboard 28), a secondary storage device (hard drive 30), and a modem 32. The unit 20 also includes a number of input/output devices including a camera interface 34 for connecting a camera 36 to the unit controller 24, a serial port 38, and a parallel port 40. The parallel port enables a variety of devices to be connected to the unit including a printer 42, or an interface 44 for ISDN, DSL (Digital Subscriber Line), or digital modem.

The unit controller 24 is comprised of a motherboard 50 and a video board 52 for controlling the display 22. A central processing unit (CPU) 54 and local memory unit 56 are mounted to the motherboard 50, which is implemented using an ISA/PC 104 board from Advanced Computer Solutions, Inc. The CPU 54, an 80/486-DX4 based embedded microcontroller, plugs into the motherboard 50 and interfaces with the local memory unit 56 via bus circuitry on the motherboard. The local memory unit 56 includes 640K of base memory and an additional 8 M of extended memory. The motherboard 50 also includes a serial interface 58 used to connect the modem 32 to the CPU and memory.

The video board 52 in the unit controller 24 controls the display 22 in response to control and data signals from the motherboard 50. The video board 22 includes a 512K frame buffer and is implemented using an MMX-VFPII from Ampro.

The display 22 is a high bright 35.5-cm color active matrix LCD. It has 640×480 resolution, 256K colors, and includes a cold cathode fluorescent tube (CCFT) back light. The display is a commercially available LCD device, and is specifically an NL 6448AC33-18 display from NEC.

The user-input device of the unit 20 is a touch screen 26 and is implemented using an E2741HL-683 touch screen and an E271-2210 touch controller from EloTouch Systems. Optionally, the user can connect a full sized keyboard 28 to the motherboard 50 via a standard keyboard interface 60.

The secondary storage device in the unit 20 is a hard disk drive 30. The hard drive 30 is connected to the motherboard 50 via a hard disk board. The specific board in this implementation is part number 950019 from Advanced Computer Solutions, Inc.

The modem 32 is a modular, internal device that plugs into the motherboard via the serial interface 58. The specific type of modem in the unit is an AM3314IVSP from Amquest. The modem supports 33,600 BPS maximum, and can transfer voice and data simultaneously. The modem is connected to a standard RJ-11 telephone connector 66 that connects the modem and telephone handset to a standard telephone line.

The unit 20 has a telephone operator interface that includes a virtual telephone keypad, and telephone handset 68. The virtual telephone keypad is controlled in software and displayed as an array of buttons that emulate a conventional telephone keypad. The telephone handset 68 is a standard earphone/microphone device used to transmit and receive audio data. The telephone handset plugs into the modem 32, which, in turn, controls simultaneous voice and data transmission over a telephone line.

To supply power to the unit 20, the user plugs a conventional 120-volt AC power source into the power connector 70. A power supply 22 in the unit converts the input power into a power signal compatible with the electronic devices in the unit 20. In this implementation, the power supply is a BN330-3 available from Tri-Mag.

To operate the device, a user enters input commands via virtual buttons displayed on the touch screen 26. The layout of the virtual buttons include a virtual keyboard and a virtual telephone keypad that enable the user to place and receive calls just like a conventional telephone.

To enter image data, the user captures a still image with the digital camera 36. The digital camera transfers the image via the PCMCIA interface to the unit controller 24. Executing image-processing software, the CPU processes the incoming digital image data and issues control signals to the video board to display the image on the display 22. The image processing software also enables a user to instruct the CPU to scale an image and archive the image on the hard drive 30 by entering commands via the touch screen or an optional keyboard.

In a preferred embodiment, the format of the image data is changed to allow the presence of the above mentioned text information (patient name and the like). To this end, a fixed-length header is inserted at the beginning of the image file provided via the PCMCIA interface. The header contains a number of data fields for patient information, which will be displayed with the image(s). Each of the fields contained in the header is prefaced with a length record, which allows the underlying software to dynamically change an internal field length should this become necessary.

Moreover, one of the data fields identifies the file as one that is valid with the system of the present invention. Thus a level of security is introduced because the image/patient-information file can be opened only with a unit that processes in accordance with those of the present invention. That is, other viewers, etc. will not recognize the format of the image/patient-information file.

It is noteworthy here that the underlying software also permits conversion of the image data back to the format originally received (by stripping off the added text and identification data) so that the image can be recognized and used by other viewers or image processing systems.

As noted above, every image collected from the digital camera is provided with a unique filename that includes a multi-digit number and a code identifying the particular unit. Thus, there is no likelihood that two different images residing in one or more units will have the same filename. Specifically, whenever file activity concerning previously unnamed (by the present system) files occurs—such as copying the image data files from the PCMCIA card to the system's storage memory—the CPU, under the control of the system software, refers to the last-used file number saved on the system and counts up as necessary to generate a filename for each new, discrete image. That number, preferably a hexadecimal (five digit's worth), is coupled to the unit's unique identifying code and used to name the particular image file. The new file number is saved in the system for look-up when the next, unnamed image files are acquired.

The CPU executes modem control software that enables the user to place a call to a remote location and then transmit voice and image date simultaneously via the phone line. The phone connection is typically made via a conventional POTS line, but also can be made via a cellular ISDN, T-1 or satellite communication link.

The modem control software performs a variety of call control and data transmission tasks, including packaging and unpackaging image data so that it can transmitted via a phone line and reconstructed. When the telecommunication unit is in the receive mode, it unpackages image data from the phone line and progressively displays the image on the display. The modem separates image data from voice data and transfers the image data to the unit controller. Image processing software executing in the CPU then renders the image for display via the frame buffer in the video board. The modem sends incoming voice signals to the telephone handset 68, which, in turn, converts the voice signal into an audio signal.

Having described the internal structure and operation of the telecommunication unit, we now turn to the external structure of the unit.

Figure 2:
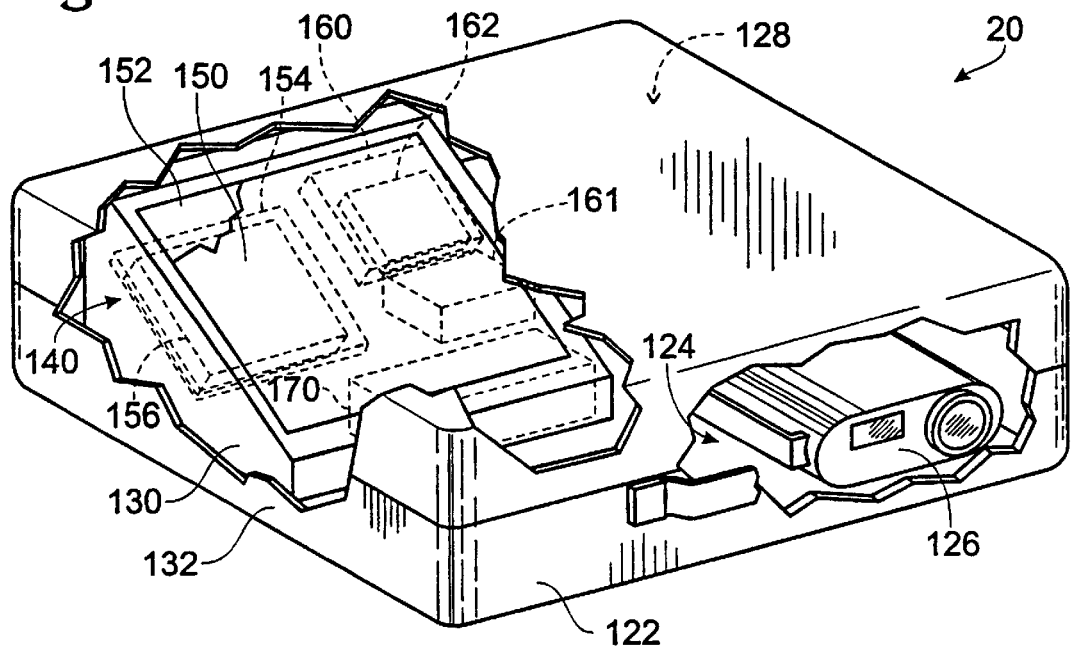
FIG. 2 illustrates a perspective view of one implementation of the mobile telecommunication unit shown in FIG. 1.

FIG. 2 illustrates a perspective view of one implementation of the mobile telecommunication unit 20 shown in FIG. 1. The mobile telecommunication unit 20 is enclosed in a portable carrying case. Specifically, the enclosure 122 is a modified 103 C-SI briefcase manufactured by Zero Halliburton. The approximate size of the briefcase is 45.7 cm by 33.0 cm wide by 15.2 cm deep. The interior compartment of the briefcase has a storage space 124 for a digital camera 126 and an additional storage space 128 for connector cables.

The interior compartment also includes a variety of parts for mounting the electronic devices shown in FIG. 1 securely inside the briefcase 122. A chassis 130 is mounted to the bottom panel 132 of the briefcase. A display connector plate is used to mount the display to the chassis. A shield plate shields the electrical components connected to the back of the display from the display. Finally, a secure plate is used to mount the electrical components to the back of the display.

The user interface and other electronic components in the unit 20 are implemented in an integrated mounting structure that includes a display assembly 140 and a series of stacked boards mounted to it. The display assembly is comprised of a touch membrane 150, fastened adjacent to the viewing surface of an LCD display 152. The motherboard 154 and hard disk board 156 are mounted in a stacked configuration on one side of the back of the display. The PCMCIA interface board 160 and modem 162 are mounted in a stacked configuration on the other side of the back of the display. The display 152 and the components mounted to it are fixed inside the enclosure. The power supply 170 of the unit 20 is mounted to the bottom panel of the enclosure and sits underneath the display assembly.

The unit is also equipped with a telephone, which includes a telephone handset and a speakerphone. The telephone includes an extra audio input for an electronic stethoscope. The telephone plugs into the modem through a telephone line connector.

Figure 3:
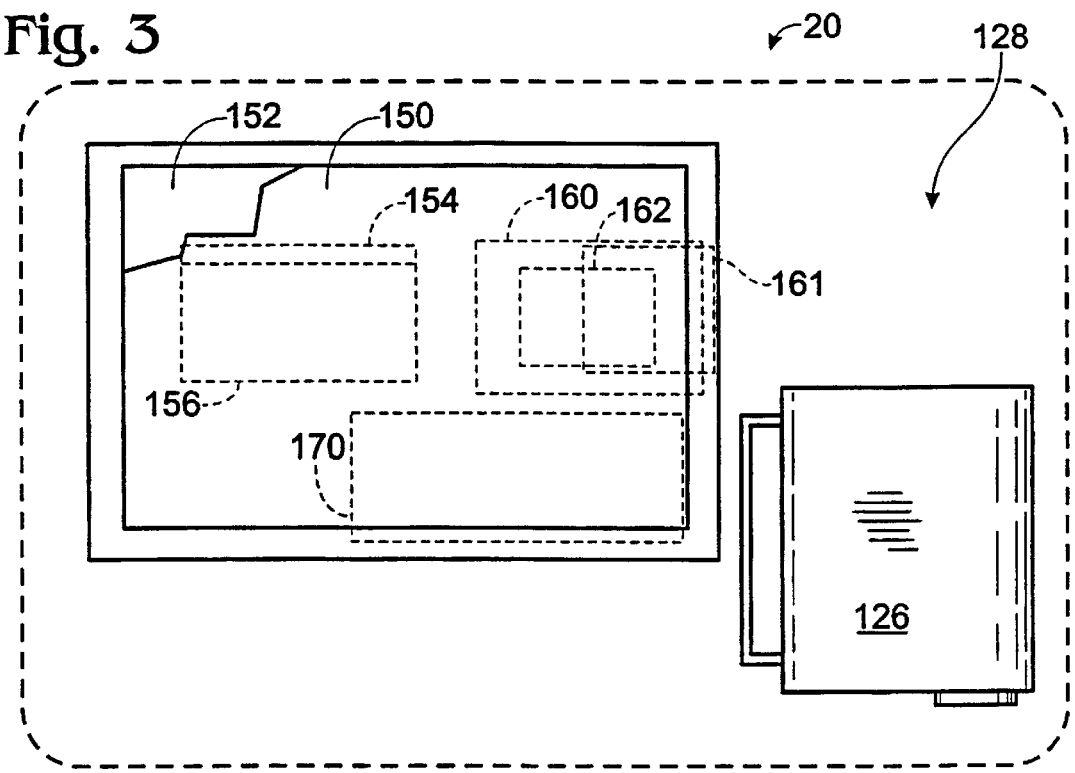
FIG. 3 illustrates a top plan view of the mobile telecommunication unit of FIG. 2.

FIG. 3 illustrates a top plan view of the mobile telecommunication unit 20. The top view shows the position of the camera compartment relative to the display. Each of the three-digit reference numbers shown in FIG. 3 correspond to the same components as in FIG. 1 where the FIG. 1 reference numbers have the same digits as the last two digits of the FIG. 3 numbers.

Figure 4:
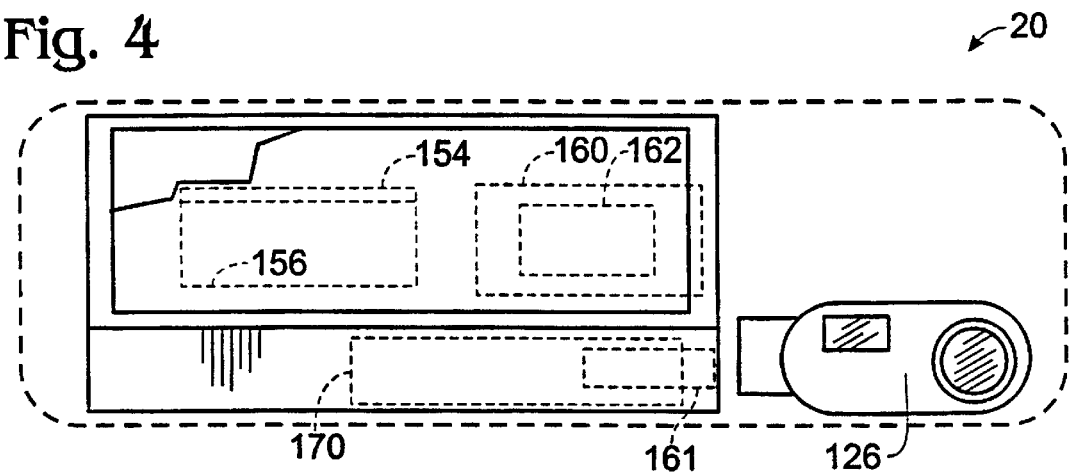
FIG. 4 illustrates a front elevation view of the mobile telecommunication unit of FIG. 2.

FIG. 4 illustrates a front elevation view of the mobile telecommunication unit 20. This view shows the stacked configuration of the mother board 154 and hard drive 156 on one side of the display assembly, and the stacked configuration of the PCMCIA card 160 and modem 162 on the other side of the display assembly.

Figure 5:
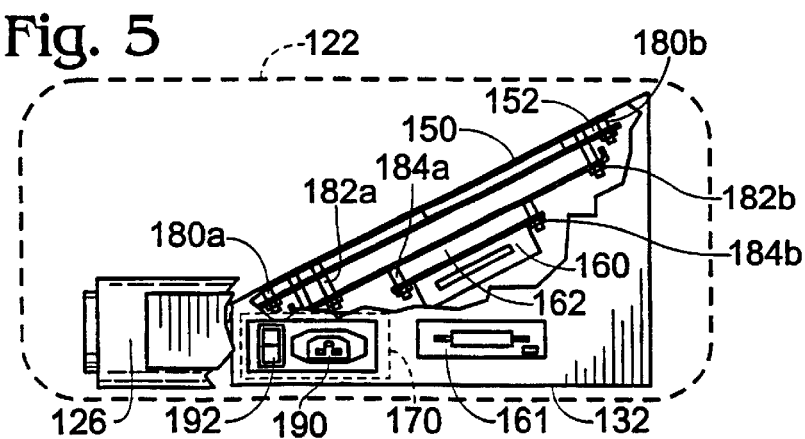
FIG. 5 shows a side elevation view of the mobile telecommunication unit of FIG. 2.

FIG. 5 shows a side elevation view of the mobile telecommunication unit 20. This view more clearly illustrates how the touch membrane 150 and other boards are connected to the display 152. The touch membrane 150 is mounted on the top of the display 152 via conventional fasteners 180a-b. The motherboard is mounted to the back of the display via fasteners 182a-b. The PCMCIA board 160, and modem 162 are mounted to the back the display via fasteners 184a-b.

The power supply 170 is mounted to the bottom panel 132 of the case 122. A power connector 190 and power switch 192 are located adjacent to the power supply 170 on the side of the unit 20.

In addition to the unique features of the preferred hardware configuration, the software contains many distinctive attributes. The software executing on the unit includes the user interface as well as routines used to establish connections, transfer audio and image data, perform file management, encode and decode image data files, and perform image processing functions.

An objective of the user interface design is to make the unit easy to use and to avoid the need for extensive training. To achieve this goal, a menu driven software package was developed to run on a DOS based platform. All functions of the user interface are accessible though virtual buttons created by the software. Intuitive menu choices allow inexperienced users to utilize the power of the system fully. An on-line help system is also included to guide users though any problems they might encounter.

Figure 6:
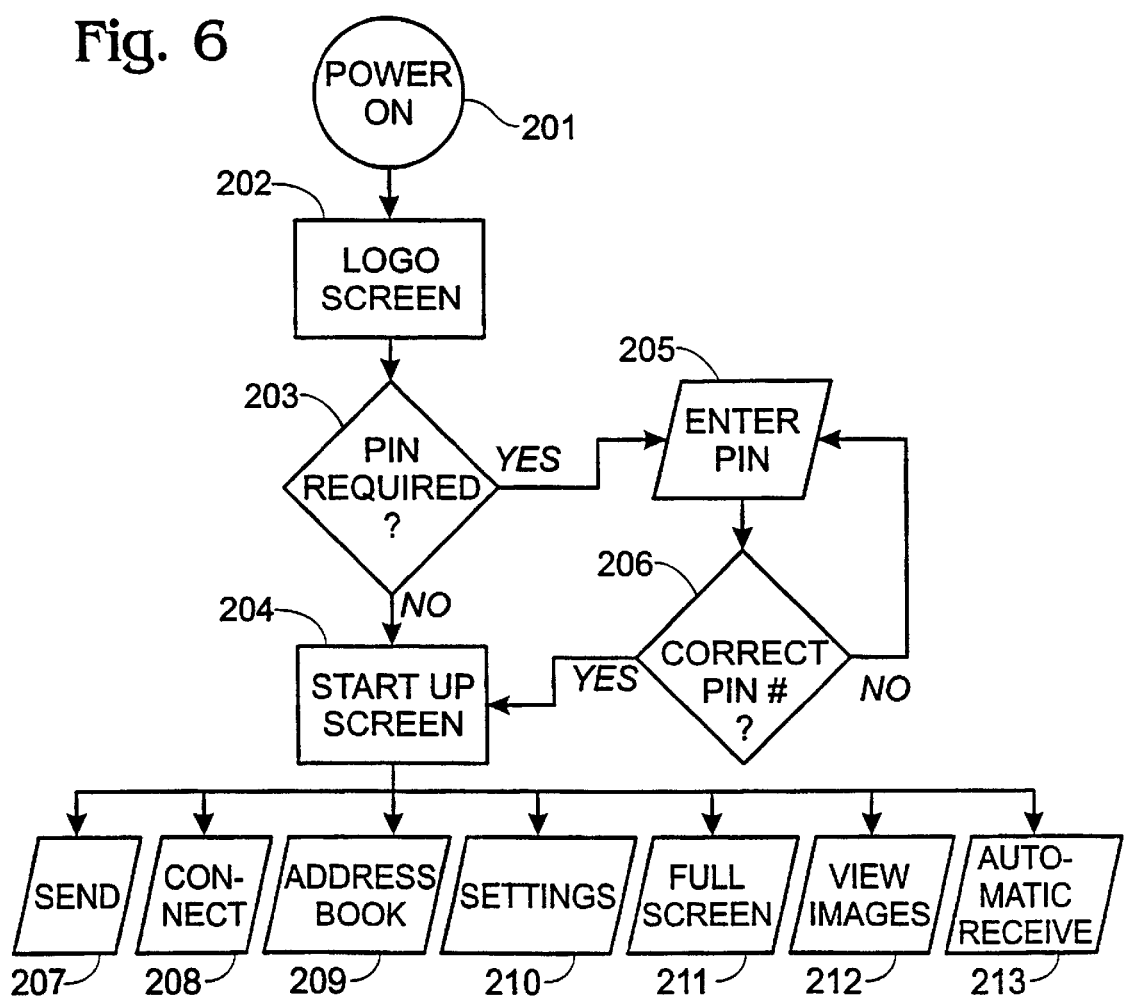
FIG. 6 is a flow diagram illustrating the operation of the unit at start-up.

FIG. 6 is a flow diagram illustrating the operation of the unit at start-up. When power is turned on 201, the system displays a logo screen 202, which starts an initiation process. The user is asked 203 for a Personal Identification Number, PIN. If the PIN is correct, the system displays the start up screen 204. If a user forgets the PIN, then a special ten-digit PIN can be entered 205 to reset the PIN to 0000. The PIN requirement can be turned off in the settings module described below with reference to FIG. 10, 252. The start up screen displays virtual buttons for send 207, connect 208, address book 209, settings 210, full screen 211, view images 212, and automatic receive 213. When the user selects one of the buttons, the system activates the corresponding module.

FIG. 7 is a flow diagram illustrating the operation of the unit when the user activates the send 214 module from the start-up screen. Images can be selected from the archive (e.g., a file system for the hard disk) using the view images module shown in FIG. 11. If the system is connected to a remote system 215, the selected images 221 are sent to the remote unit 222. If the system is not connected to a remote system 215, the connect module is activated 225 to send images 226.

Figure 9:
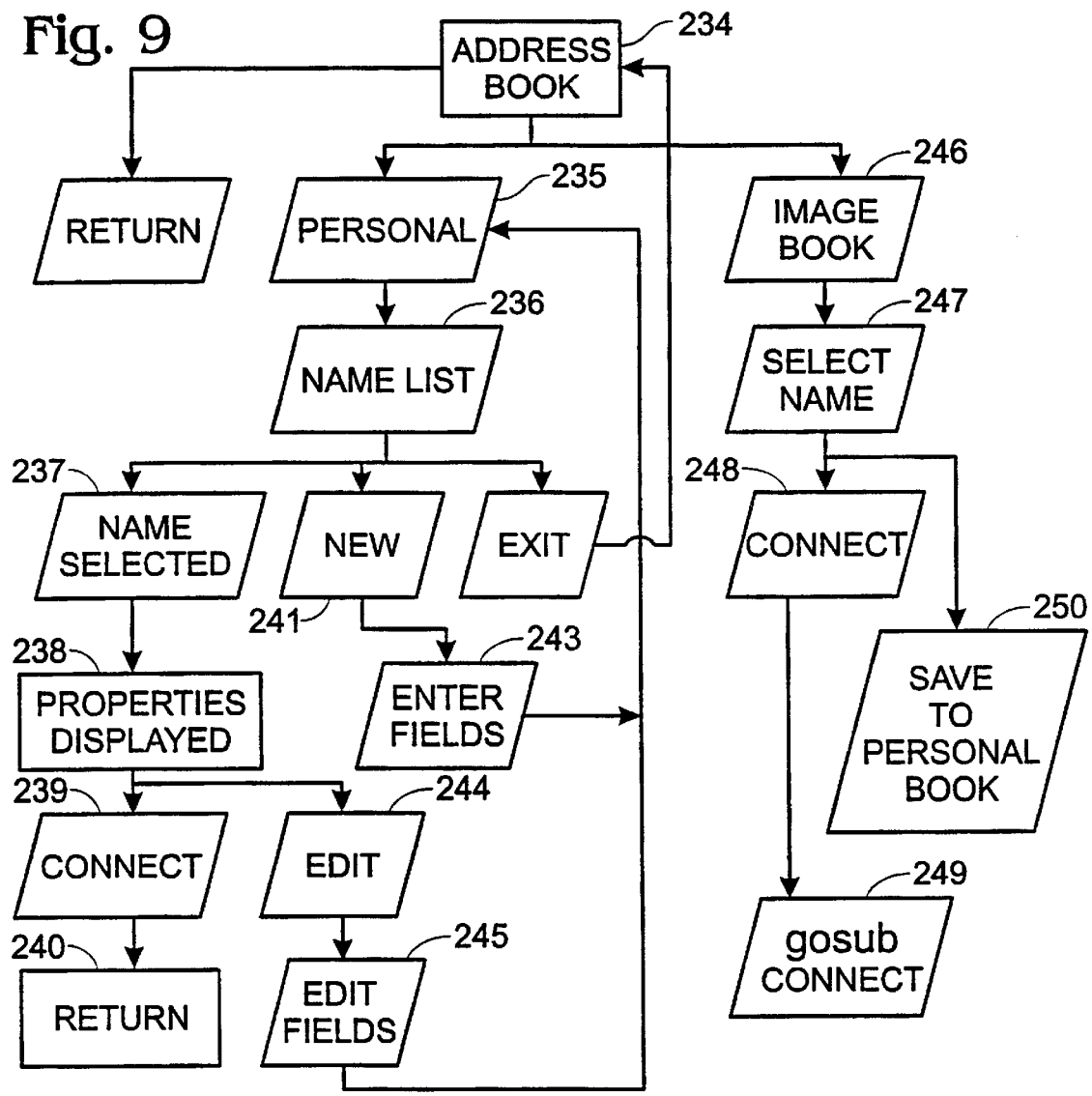
FIG. 9 is a flow diagram illustrating the operation of the address book module.
Figure 11:
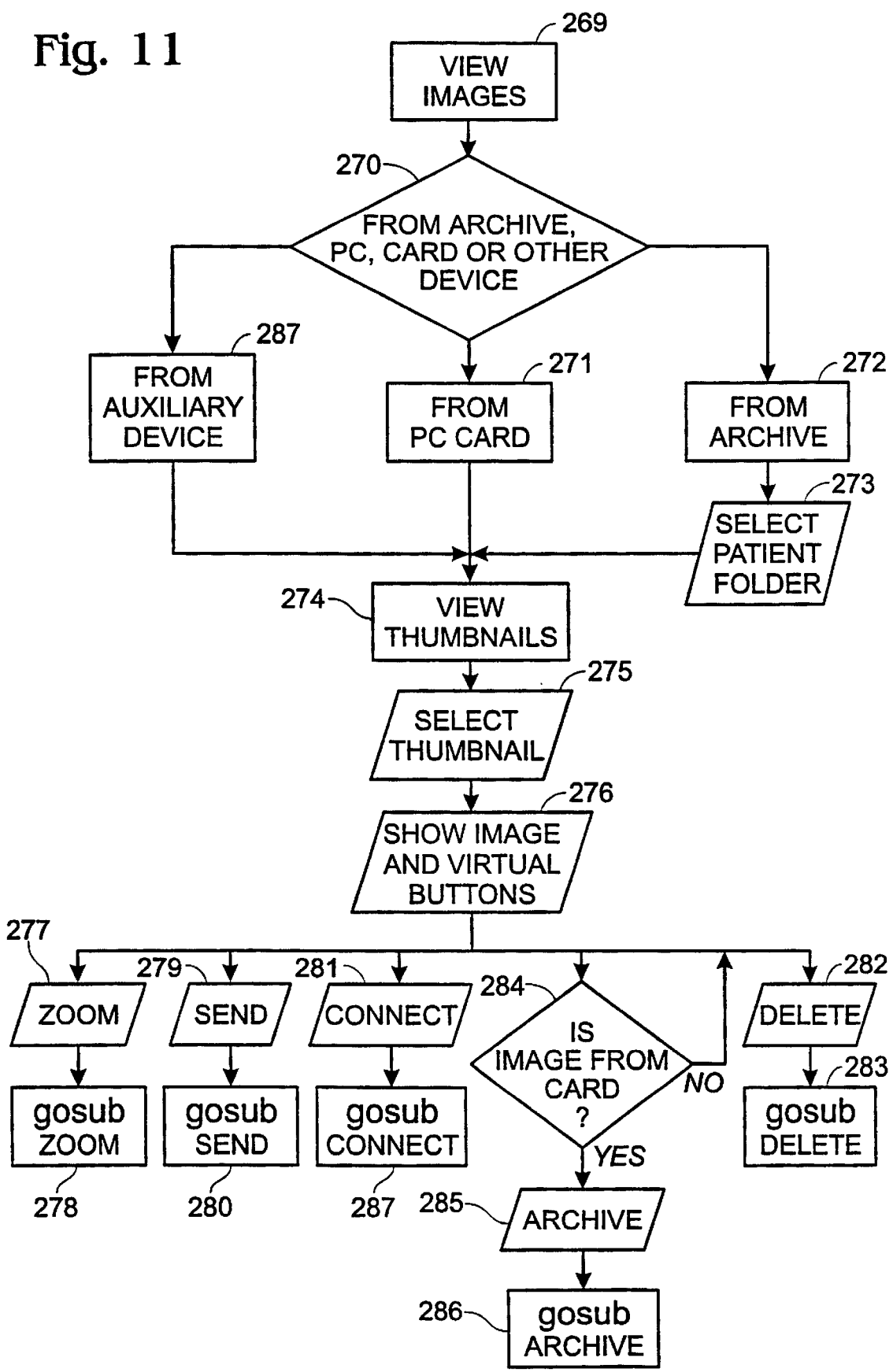
FIG. 11 is a flow diagram illustrating the operation of the system when the user activates the view images module.

FIG. 8 is a flow diagram illustrating the operation of the connect module. The connect module is activated 227 by the virtual button for the connect module 208, or automatically through send (FIG. 7), or view (FIG. 11). The phone number to dial can be selected in one of two ways. First, a virtual telephone keypad 228 can be displayed 229 and activated to enter the number manually 230. The system then dials the number as shown in function block 233. Second, a number can be selected from an internal address book 231. The address book module is then activated 232 as shown in FIG. 9. When the number is returned from the address book, the connect module executes a routine to instruct the modem to dial the number 233.

FIG. 9 is a flow diagram illustrating the operation of the address book module. The address book module 234 is activated from the start up screen, or the connect function. The user can select the system address book (shown as IMIGE) 246, a personal address book 235, or can return to the previous screen. The system address book is automatically updated monthly when the system is logged onto a bulletin board to report minutes of usage, and receive software upgrades. If the user selects a name from the list 247, the user is given an option to store the name in the personal address book 235. The system is connected 248, 249 to the remote system selected from the system address book.

If the user selects the personal address book 235, the system displays a list of names 236. The user then has the option to create a new entry 241, exit 243 to the start of the address book 234, or select a name from the list 237. If the new entry 241 is selected, the user is prompted to fill in fields such as the contact's name, phone number, and address. If the user selects a name 237, the system displays the properties of the contact 238. The fields can then be edited 244, 245, or a connection can be established 239, 240.

Figure 10:
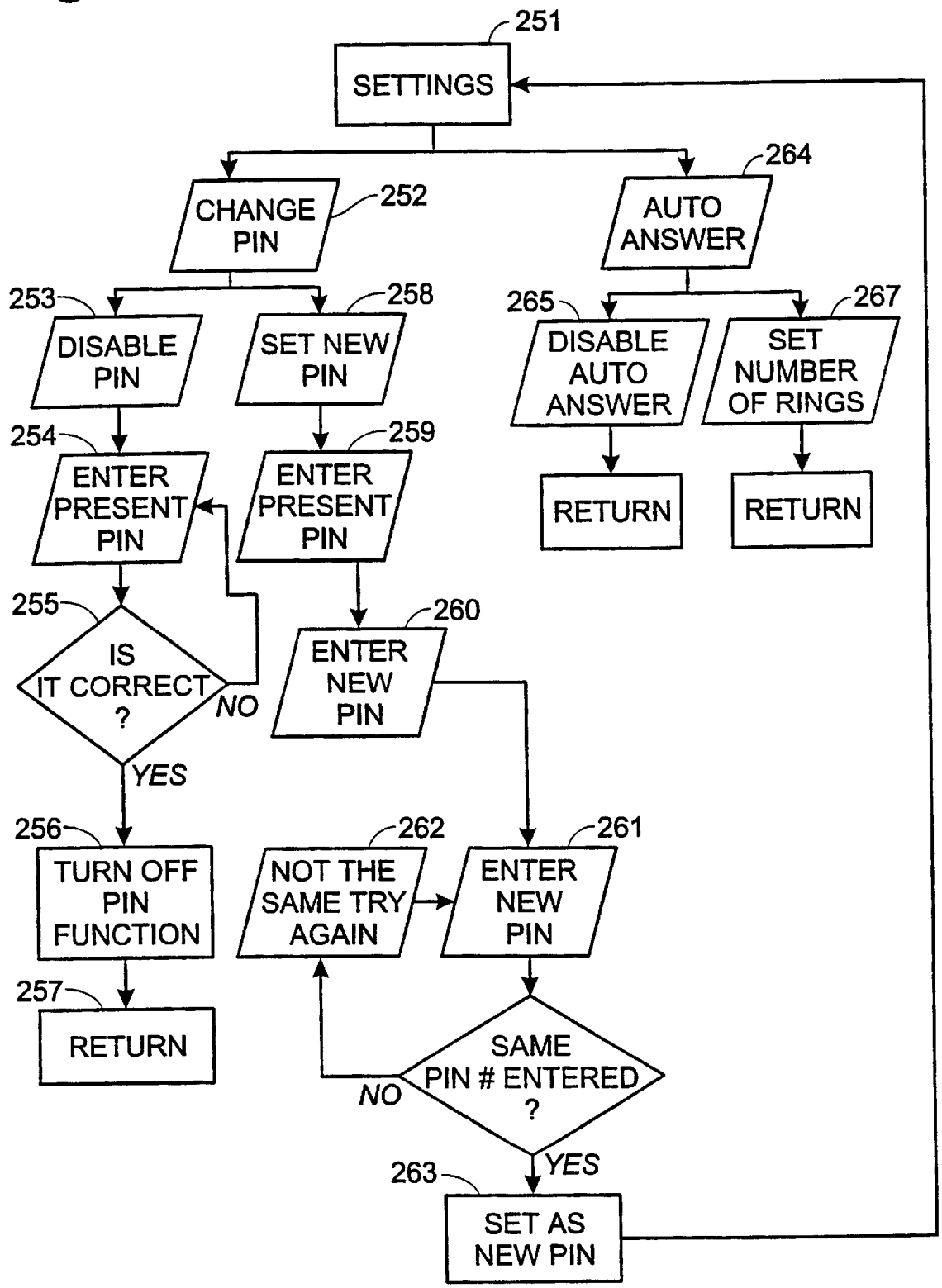
FIG. 10 illustrates the operation of the system when the user activates a module for choosing settings of the unit from the start-up screen.

FIG. 10 illustrates the operation of the system when the user selects the setting module 251 from at the start-up screen. Presently, there are two features for which the settings can be changed: 1) auto answer and 2) change PIN. More features can be added during the monthly update. If the user selects auto answer 264 to change the feature settings, the system gives two options: one to disable auto answer 265, and another to set the number of rings before answering 267. If the change PIN 252 option is selected from the settings screen 251, there are two options, disable PIN 253, or set new PIN 258. If the user selects the disable PIN 253 feature, the user is prompted to input the present PIN 254. If the user has forgotten the PIN, then the special ten digit PIN is entered, the PIN function is turned off 256, and the system returns 257 to the settings screen 251.

If the user selects the option to set a new PIN 258 from the change PIN branch 252, the user is prompted for the current PIN 259. The special ten-digit PIN can also be entered here. To verify the PIN, the user is prompted to enter the new pin twice and each time the PIN is checked to make sure it is correct 260-262. If it is correct, the system stores the new PIN as the current PIN 263.

FIG. 11 is a flow diagram illustrating the operation of the system when the user activates the view images module 269. This module enables a user to view images from an archive 272 on the hard disk, a PC card 271, or an auxiliary device 287. If the archive is selected 270, the user can then select a patient folder 273. When a user selects a folder, the system first displays thumbnail images 274. If the user selects images from a PC card 271 or an auxiliary device 287, the user can first select thumbnail images 274. From the thumbnails, the user can select an individual image 275. When the user selects a thumbnail, the system displays a full screen view of the selected image 276. As noted above, the originally received image is modified to include patient information. Thus, the full screen image will include the information, preferably located in a corner of the screen. Alternatively, the patient information can be hidden from the view, so that the entire screen can be devoted to display of only the image. The user can then choose to zoom 277, send 279, connect 281, delete the image 287, or archive the image 285.

As shown in FIG. 11, at 276, the system displays the image along with the virtual buttons described above. Two of these buttons, which may be labeled "POINT" and "UNPOINT" are responsive to the user's touch to carry out the pointer or tag functions described earlier. The pointers are dynamically generated for the active file. Thus, the operator selects the POINT button, which prepares the system to treat the next touch of the screen as a location on the image where the user desires a new pointer. The pointer may be any suitable icon.

The system assigns a new, unique value or identifier to display as or with the pointer, such as a letter "A." Once the screen is touched, the user's unit generates a packet of data comprising the following: 1) the screen coordinates (x, y) in pixel units of the selected (touched) pointer location, 2) the zoom factor employed in the user's view, 3) the x and y offsets associated with the image database (the real image is always larger than the display area, so there is re-mapping between the screen and the image—this allows panning and zooming), 4) the filename of the active image, and 5) the current value of the pointer.

With this information the pointer can be dynamically repositioned (that is, maintain its proper relative positional relationship in the image) irrespective of whether the viewer pans or zooms to change the view of the image.

The data packet is instantly provided to the remote unit (that is connected to the user's, local unit) so that that unit can replicate the zoom factor, pan viewpoint, pointer value and location on the correct image. As noted above, a received pointer will, preferably, have a different color or appearance as compared with one generated on the receiving machine.

After the UNPOINT button is touched, the system removes the last-added pointer from the local and remote units. Subsequent touches of the UNPOINT button sequentially removes the remaining pointers, newest ones first.

FIG. 12 is a flow diagram illustrating the operation of the system when the receive module 288 is activated. The remote unit only activates this module when an image or group of images is sent to the local system. The system checks a patient name of the received image 289. If a patient folder does not already exist 290, the system creates one 291. Next, the system stores the image in the existing or the newly created folder 292. If more images are to be received 293, steps 289-293 are repeated. When the remote connection is terminated the system returns to its prior state 294.

Figure 13:
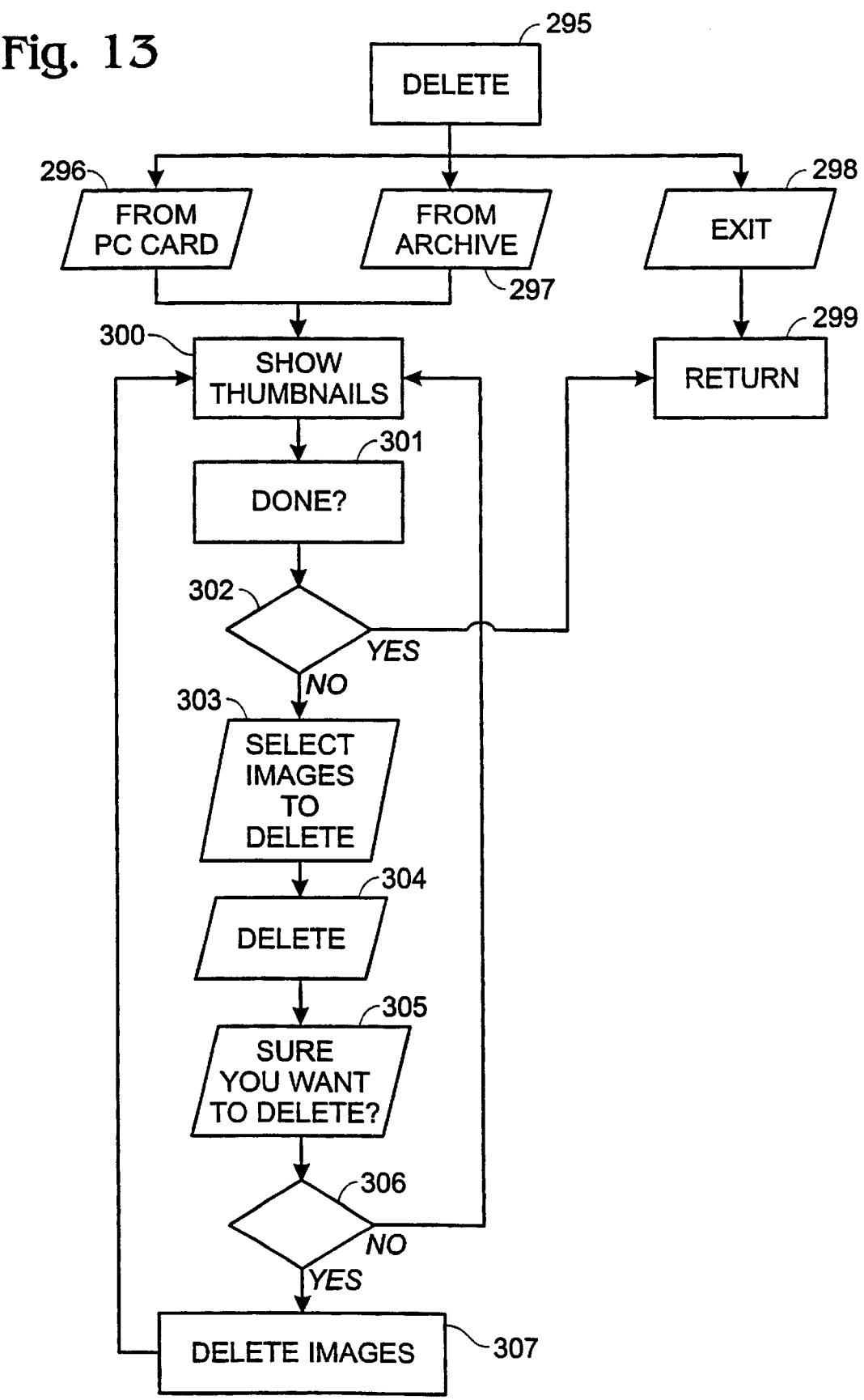
FIG. 13 is a flow diagram illustrating the operation of the delete module.

FIG. 13 is a flow diagram illustrating the operation of the delete module 295. When the delete module is activated, three options are possible: delete an image on the PC card 296, delete an image from the archive 297, and exit 298 to the prior screen. Thumbnails are shown 300 from the PC card 296 or the archive 297. The user can exit (301, 302) the delete 295 module at this time. If the user wishes to delete an image, he or she selects the images to delete 303. The user is asked to select delete again to verify that the user wants to delete the image 304-306. The image is deleted 307 if the user selects the delete option and then confirms the delete operation as shown in blocks 304 and 306.

Figure 14:
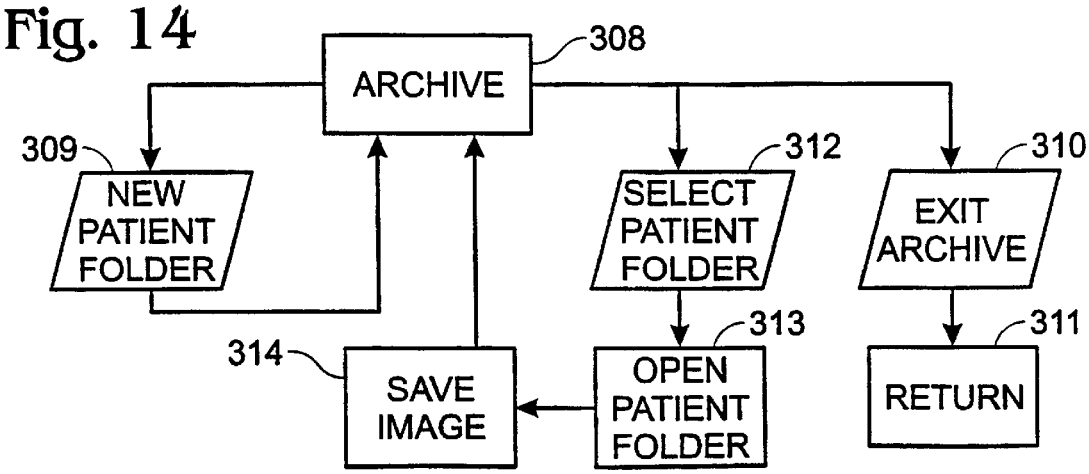
FIG. 14 is a flow diagram illustrating the operation of the archive module.

FIG. 14 is a flow diagram illustrating the operation of the archive module 308. When the user activates the archive module, the system displays a screen that enables the user to create a new patient folder 309, save images to an existing patient folder 312, or exit 310 to the previous screen 311. If the user chooses to create a new patient folder, the system prompts the user for patient information 309 such as, name, birth date, and referring doctor. If the user chooses to save an image to an existing folder 312, the folder is selected 312 and opened 313, and the image is saved 314.

Figure 15:
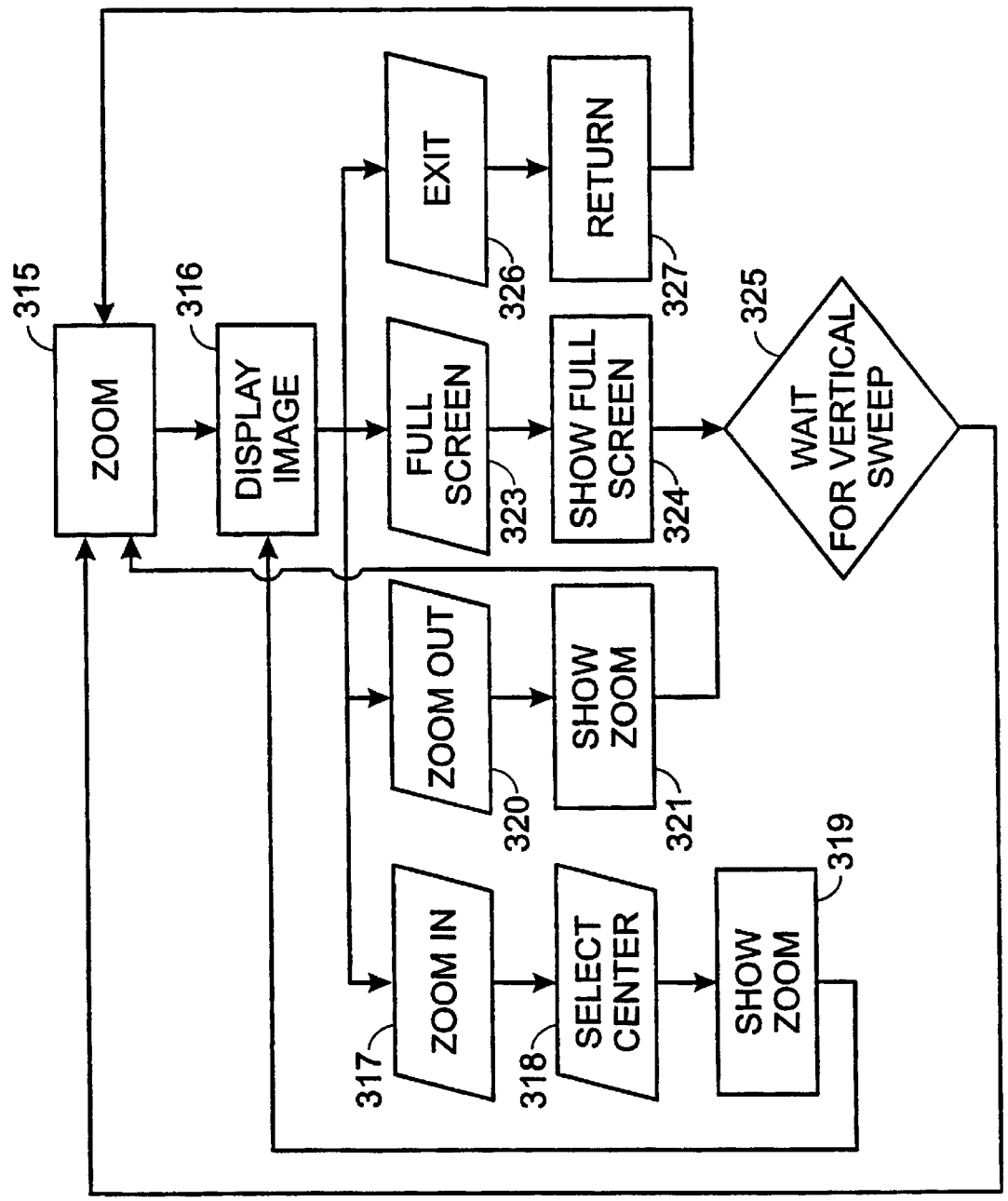
FIG. 15 is a flow diagram illustrating the operation of the zoom module, which enables a user to manipulate an image on the display.

FIG. 15 is a flow diagram illustrating the operation of the zoom module 315, which enables a user to manipulate an image on the display. The zoom module can be activated when an image is displayed 316. The zoom module provides four options: zoom in 317, zoom out 320, view full screen 323, and exit 326 to previous screen. If the user requests the zoom in function 317, the system prompts the user to touch the center of the zoom 318. In response, the system scales the image and displays the zoomed image 319. This can be repeated to magnify the image. The user can also choose to reduce the image 320. In response, the system reduces the image and displays the reduced image 321. The user can also choose to display an image so that it occupies the full screen 323. If the user selects the full screen option, the system displays the present image 324 until the user makes a vertical sweep 325 of the touch screen.

FIG. 16 is a flow diagram illustrating the operation of the system while it is in idle mode 328. An idle module executes on the system when it is in idle mode. Idle mode is activated any time that there has not been a touch of the screen or an activation of the unit by a remote system for a predetermined period of time, e.g., five minutes. When idle mode 328 is activated, a logo screen 329 is displayed for thirty minutes 330. After thirty minutes the screen is deactivated and turns black 331 saving on power consumption. Any time the screen is touched or a remote system activates the unit 332, it reverts back to the screen displayed prior to idle mode 213.

The software is not limited to functions accessible to the user. An internal timer keeps track of time connected to a remote system. Every month the system automatically calls a bulletin board and reports the minutes of use. The system has been designed for easy software upgrade. New software can be implemented by PC card, remote access through the modem, or during the monthly connection. Any system wide upgrades will be transferred to the remote units during the monthly connection. The system can be set up to make an automatic connection over night to save on long distance charges. All images are transferred in an encrypted file format, providing a level of encryption that does not allow viewing of the images except for another system unit. The system encrypts image files by encoding a text file including information about the image, such as a patient name, doctor, birthdate and date of the image, in an image file as described above.

While the invention is described with reference to a specific implementation, it should be understood that the scope of the invention is not limited to this implementation.

A variety of types of input devices and display devices can be used to implement the user interface. In addition, the software features and implementation can vary as well.

In view of the many possible embodiments to which the principles of our invention may be applied, it should be recognized that the illustrated embodiment is only a preferred example of the invention and should not be taken as a limitation on the scope of the invention.

What is claimed is:

1. In a system that displays an image on a local display unit and on a remote display unit, which local and remote display units are used and observed by a respective local user and remote user, a method of identifying portions of the displayed images, comprising the steps of:

displaying on the local unit a first local icon at a location on the locally displayed image, which location being selected by the local user; and transmitting the remote user information for generating on the remotely displayed image a first remote icon corresponding to the first local icon such that the first remote icon is displayed on the remotely displayed image at the location on the image selected by the local user; and displaying on the local unit a second local icon at a location on the locally displayed image, which location being selected by the remote user; and providing the first remote icon with an appearance indicating that the location of the first remote icon was selected by the local user and not the remote user.

2. The method of claim 1 further comprising the steps of:
providing both the local and remote units with means to change the size of the remotely and locally displayed images by zooming; and including in the information transmitted to the remote user data representing the size of the displayed local image thereby to permit the first remote icon to be displayed on the remote image at the location selected by the local user irrespective of differences in the size of the image displayed on the remote and the local units.

3. The method of claim 1 further comprising the steps of:
providing both the local and remote units with means to display selected portions of the remote and local images by panning; and including in the information transmitted to the remote user data representing the location of the first local icon relative to a portion of the image that is common to both the local and remote image thereby to permit the first remote icon to be displayed on the remote image at the location selected by the local user irrespective of differences in the portions of the images selected for display on the remote and the local units.

4. The method of claim 1 further comprising the steps of:
providing both the local and remote units with means to display two or more images at a time and for selecting one of the two or more images on which to display a first local icon; and including in the information transmitted to the remote user data representing the one of the displayed two or more images on which the first local icon is displayed.

5. The method of claim 1 further comprising the steps of:
providing means for displaying on the local and remote units text information for display with the displayed image;

including in the information transmitted to the remote user data representing text information for display; and associating the text information with the first local icon, thereby to associate that text information with the first remote icon.

6. The method of claim 1 further comprising in addition to the displaying and transmitting steps the step of removing from the local unit the displayed first local icon; and transmitting to the remote user information for removing the first remote icon from the remotely displayed image.

7. The method of claim 6 further comprising the step of providing on the local unit a touch screen for permitting the local user to touch the local unit for removing from the local unit the displayed first local icon.

8. The method of claim 7 further comprising the step of displaying on the local unit a virtual button that when touched by the local user is identified as a command for removing from local unit the displayed first local icon.

9. The method of claim 1 including the steps of:
linking the local and remote units via a telecommunications system; and sending voice data simultaneously with the information for generating the first remote icon.

10. The method of claim 1 including the step of packaging the local unit as a portable device connectable with more than one type of telecommunications system.

11. The method of claim 1 including the step of storing on the remote unit information representative of the remotely displayed image and first remote icon, thereby to enable later display of that image with the first remote icon.

12. The method of claim 1 further comprising the step of providing on the local unit a touch screen for permitting the local user to touch the local unit for selecting the location of the first local icon.

13. The method of claim 12 further comprising the step of displaying on the local unit a virtual button that, once touched, identifies a subsequent touch of the touch screen by the local user as the location selected for the local icon.

14. In a system that displays an image on a local display unit and on a remote display unit, which local and remote display units are used and observed by a respective local user and remote user, a method of identifying portions of the displayed images, comprising the steps of:

generating at the remote unit an image;

displaying the image on the remote unit;

transmitting the image to the local unit for display on the local unit;

on the local unit, pointing a first local icon to a location on the locally displayed image, which location being selected by the local user;

transmitting to the remote user information for generating on the remotely displayed image a first remote icon corresponding to the first local icon such that the first remote icon is displayed on the remotely displayed image at the location on the image selected by the local user and on the local unit simultaneously with the pointing of the first icon, pointing a second local icon to a location on the locally displayed image, which location being selected by the remote user.

15. The method of claim 14 including the step of assigning to the second local icon an appearance unlike that of the first local icon.

* * * * *